United States Patent [19]

Peterson et al.

[11] Patent Number: 5,250,587
[45] Date of Patent: Oct. 5, 1993

[54] ACTIVATION OF ETHYLENE/CARBON MONOXIDE POLYMERS

[75] Inventors: Edward R. Peterson, Lake Jackson; Gerald M. Lancaster, Surfside, both of Tex.

[73] Assignee: The Dow Chemical Company, Midland, Mich.

[21] Appl. No.: 819,557

[22] Filed: Jan. 13, 1992

Related U.S. Application Data

[63] Continuation of Ser. No. 642,101, Jan. 16, 1991, abandoned.

[51] Int. Cl.$^5$ .................. C08G 67/02; C08K 3/14; C08K 3/22; C08K 3/34
[52] U.S. Cl. ..................... 523/137; 524/409; 524/413; 524/416; 524/430; 524/442; 524/443; 528/392
[58] Field of Search ............ 523/137; 528/392; 524/443, 409, 413, 416, 430, 442

[56] References Cited

U.S. PATENT DOCUMENTS 4,601,948 7/1986 Lancaster et al. ............. 428/441
4,962,148 10/1990 Orikasa et al. ................ 524/409
5,068,061 11/1991 Knobel et al. ................. 524/495

FOREIGN PATENT DOCUMENTS 3265939 11/1988 Japan ............ 524/443
3009937 1/1991 Japan ............ 524/443

OTHER PUBLICATIONS

Canadian Paint and Varnish Magazine, Sep., 1956, pp. 17, and 54-57.

Primary Examiner—James J. Seidleck
Assistant Examiner—Thomas Hamilton, III

[57] ABSTRACT

Additives which have low loss factors and high dielectric constants are added to olefin/carbon monoxide copolymers, thereby synergistically enhancing the beneficial thermal response of the copolymers to the action of radio frequency energy, especially microwave energy. The additives may be, e.g., metal salts, metal oxides, and metal-organic compounds. The copolymer is preferably comprised of ethylene/carbon monoxide (E/CO) or a terpolymer of E/CO/M, where M represents minor amounts of one or more other olefinically-unsaturated monomers which are copolymerizable with ethylene.

16 Claims, No Drawings

ACTIVATION OF ETHYLENE/CARBON MONOXIDE POLYMERS

CROSS-REFERENCE TO RELATED APPLICATION

This is a continuation of application Ser. No. 07/642,101 filed Jan. 16, 1991, now abandoned, which is related to pending application Ser. No. 252,485 filed Sep. 30, 1988, which is incorporated herein by reference.

FIELD OF THE INVENTION

The addition of compounds having a low loss factor are added to ethylene/carbon monoxide polymers to provide improved response of the polymers to microwave energy.

BACKGROUND OF THE INVENTION

The thermal response to high frequency (HF) electromagnetic energy, including radio frequency (RF) and even microwave (MW) energy, of olefin copolymers which contain carbon monoxide (CO) as a copolymer constituent is disclosed, e.g., in recent U.S. Pat. Nos. 4,600,614 4,601,948 4,640,865 4,660,354 4,671,992 4,678,713 4,762,731 4,766,035 4,787,194 4,728,566.

Patents showing the halogenation of ethylene polymers containing copolymerized carbon monoxide (CO) are U.S. Pat. Nos. 4,616,072 and 4,687,805.

The interest of the polymer and packaging industries in the beneficial thermal response (i.e., the RF-heatability, esp. MW-heatability) of the ethylene polymers containing copolymerized CO is on the increase and improvements which enhance or aid in regulating the thermal response (heating) are desired.

The prior art has used "lossy" materials, such as carbon or ferrites, as additives to polymers to induce or increase the loss factor of the polymers so as to induce or increase thermal response of the polymer to electromagnetic radiation energy, thereby causing a heat build-up in the polymer. These "lossy" materials have high loss factors and were often selected because of that property. Also there are reasons why one would wish to avoid the use of additives such as carbon or ferrites, such as for aesthetic or clarity purposes. In contradistinction to the use of additives having high loss factors to induce or increase the thermal response of a polymer to the effects of electromagnetic radiation energy, the present invention uses additives (also called "agents") which have very low loss factors and in so doing achieve a synergistic effect with the RF effect recently found to exist in CO-containing copolymers, as shown in the above-identified patents.

SUMMARY OF THE INVENTION

A synergistic heating effect is achieved by adding to a CO-containing olefin copolymer an agent having a very low loss factor. The synergistic effect is produced by the action of electromagnetic radiation in the radio frequency (RF) range, especially in the microwave (MW) range, acting on the novel polymer/agent composition to heat the composition at a faster rate and/or to a greater extent than either material alone is heated by the radiation. The agents also have a high dielectric constant.

The polymer/agent compositions of this invention are useful in preparing articles in which heating with RF, esp. MW, energy is desired.

DETAILED DESCRIPTIONS OF THE INVENTION INCLUDING THE BEST MODE KNOWN

For purposes of brevity and clarity, the following abreviations are used in many places in the descriptions:

| Acronym | Represents | Acronym | Represents |
|---|---|---|---|
| RF | radio frequency | MMA | methyl methacrylate |
| MW | microwave | EMA | ethyl methacrylate |
| CO | carbon monoxide | BMA | butyl methacrylate |
| AA | acrylic acid | VA | vinyl acetate |
| MAA | methacylic acid | PVA | polyvinyl acetate |
| MA | methyl acrylate | EVA | ethylene/VA |
| EA | ethyl acrylate | VOH | vinyl alcohol* |
| BA | butyl acrylate | PVOH | poly(VOH) |

(*it is known that VOH exists through the hydrolysis of vinyl acetate groups which are polymerized into a polymer chain)

In this disclosure, all percentages (%) are by weight unless otherwise specified.

The CO-containing olefin polymers may contain from about 1% to an amount up to 50% CO, preferably about 3-30%, most preferably about 5-20%. The preferred olefin which forms the major portion of the polymer chain is ethylene and for that reason the descriptions and data in this disclosure are directed to ethylene as the olefin. Other olefins, such as propylene and butene, are within the ambit of the present invention for use in supplanting or replacing the ethylene, though catalysts which can copolymerize oxygen-containing monomers, such as CO and AA, with unsaturated hydrocarbons of greater than 2 carbons are not very efficient; the higher olefinic hydrocarbons usually require a metal coordination catalyst, such as a Ziegler-type catalyst, whereas E/CO and E/CO/AA and the like are efficiently polymerized using a free-radical initiator.

Comonomers (other than CO) which may be present in the ethylene polymer in minor amounts are alpha-olefin organic monomers which contain oxygen atoms and which have more than 3 carbon atoms, especially AA, MAA, VA, and VOH and the like, so long as the total of the CO and the comonomer constitute an amount which is less than 50% of the total weight of the polymer.

The following examples are given to illustrate some embodiments of the invention, but the invention is not limited to the particular embodiments illustrated. After learning of the invention, persons skilled in the relevent arts will realize the efficacy of other embodiments without departing from the ambit of the invention claimed below.

| Freq (MH$_z$) | Log Freq. | ECO 10% Si | | ECO 10% Al$_2$O$_3$ | | ECO 10% SiC | | ECO 10% CaTiO$_3$ | |
|---|---|---|---|---|---|---|---|---|---|
| | | DC | LF | DC | LF | DC | LF | DC | LF |
| 0.001 | −3.00000 | 4.34E + 00 | 7.253E-02 | 4.008E + 00 | 6.617E-02 | 4.298E + 00 | 5.547E-02 | 4.135E + 00 | 4.827E-02 |
| 0.005 | −2.30103 | 4.259E + 00 | 7.899E-02 | 3.946E + 00 | 7.192E-02 | 4.231E + 00 | 7.405E-02 | 4.066E + 00 | 5.686E-02 |
| 0.01 | −2.00000 | 4.224E + 00 | 7.628E-02 | 3.920E + 00 | 6.960E-02 | 4.202E + 00 | 7.140E-02 | 4.035E + 00 | 5.428E-02 |
| 0.02 | −1.69897 | 4.186E + 00 | 8.260E-02 | 3.892E + 00 | 7.517E-02 | 4.171E + 00 | 7.842E-02 | 4.003E + 00 | 5.992E-02 |

-continued

| | | | | | | | | | |
|---|---|---|---|---|---|---|---|---|---|
| 0.05 | −1.30103 | 4.132E + 00 | 9.061E-02 | 3.853E + 00 | 8.267E-02 | 4.127E + 00 | 8.681E-02 | 3.957E + 00 | 6.864E-02 |
| 0.1 | −1.00000 | 4.092E + 00 | 9.598E-02 | 3.823E + 00 | 8.752E-02 | 4.092E + 00 | 9.271E-02 | 3.922E + 00 | 7.385E-02 |
| 0.2 | −0.69897 | 4.048E + 00 | 9.810E-02 | 3.789E + 00 | 8.919E-02 | 4.052E + 00 | 9.492E-02 | 3.883E + 00 | 7.600E-02 |
| 0.5 | −0.30103 | 3.984E + 00 | 1.083E-01 | 3.739E + 00 | 9.760E-02 | 3.993E + 00 | 1.056E-01 | 3.825E + 00 | 8.505E-02 |
| 1 | 0.00000 | 3.933E + 00 | 1.149E-01 | 3.698E + 00 | 1.036E-01 | 3.946E + 00 | 1.127E-01 | 3.780E + 00 | 9.111E-02 |
| 2 | 0.30103 | 3.890E + 00 | 1.205E-01 | 3.663E + 00 | 1.131E-01 | 3.905E + 00 | 1.228E-01 | 3.740E + 00 | 9.952E-02 |
| 5 | 0.69897 | 3.827E + 00 | 1.436E-01 | 3.614E + 00 | 1.318E-01 | 3.848E + 00 | 1.425E-01 | 3.684E + 00 | 1.165E-01 |
| 10 | 1.00000 | 3.804E + 00 | 1.597E-01 | 3.604E + 00 | 1.489E-01 | 3.835E + 00 | 1.697E-01 | 3.670E + 00 | 1.386E-01 |
| 15 | 1.17609 | 3.729E + 00 | 1.509E-01 | 3.758E + 00 | 1.425E-01 | 3.758E + 00 | 2.002E-01 | 3.606E + 00 | 1.637E-01 |
| 20 | 1.30103 | 3.665E + 00 | 1.373E-01 | 3.674E + 00 | 1.296E-01 | 3.674E + 00 | 2.380E-01 | 3.536E + 00 | 1.932E-01 |
| 25 | 1.39794 | 3.503E + 00 | 8.302E-02 | 3.482E + 00 | 7.958E-02 | 3.482E + 00 | 2.283E-01 | 3.368E + 00 | 1.818E-01 |
| 30 | 1.47712 | 3.051E + 00 | — | 2.990E + 00 | — | 2.990E + 00 | 1.440E-01 | 2.918E + 00 | 1.080E-01 |
| 35 | 1.54407 | 1.988E + 00 | — | 1.928E + 00 | — | 1.928E + 00 | — | 1.912E + 00 | — |
| 40 | 1.60206 | 6.220E-01 | — | 6.503E-01 | — | 6.503E-01 | — | 6.514E-01 | — |

| ECO 10% TiO | | ECO 10% ZrO$_2$ | | ECO 10% Sb | | ECO 10% Na$_2$Ti$_3$O$_7$ | | ECO Virgin | |
|---|---|---|---|---|---|---|---|---|---|
| DC | LF | DC | LF | DC | LF | DC | LF | DC | LF |
| 4.218E + 00 | 6.640E-02 | 4.147E + 00 | 5.082E-02 | 4.115E + 00 | 5.418E-02 | 4.464E + 00 | 6.865E-02 | 3.782E + 00 | 4.422E-02 |
| 4.155E + 00 | 7.704E-02 | 4.074E + 00 | 6.825E-02 | 4.048E + 00 | 7.300E-02 | 4.357E + 00 | 7.887E-02 | 3.714E + 00 | 3.754E-02 |
| 4.128E + 00 | 7.455E-02 | 4.042E + 00 | 6.610E-02 | 4.016E + 00 | 6.944E-02 | 4.299E + 00 | 7.472E-02 | 3.686E + 00 | 3.206E-02 |
| 4.098E + 00 | 8.049E-02 | 4.010E + 00 | 7.390E-02 | 3.986E + 00 | 7.379E-02 | 4.233E + 00 | 8.118E-02 | 3.654E + 00 | 3.417E-02 |
| 4.055E + 00 | 8.942E-02 | 3.963E + 00 | 8.402E-02 | 3.940E + 00 | 8.145E-02 | 4.139E + 00 | 8.777E-02 | 3.608E + 00 | 3.955E-02 |
| 4.021E + 00 | 9.521E-02 | 3.928E + 00 | 9.090E-02 | 3.906E + 00 | 8.661E-02 | 4.073E + 00 | 9.251E-02 | 3.574E + 00 | 4.542E-02 |
| 3.982E + 00 | 9.763E-02 | 3.888E + 00 | 9.449E-02 | 3.868E + 00 | 8.845E-02 | 4.009E + 00 | 9.388E-02 | 3.536E + 00 | 5.133E-02 |
| 3.923E + 00 | 1.074E-01 | 3.829E + 00 | 1.055E-01 | 3.811E + 00 | 9.747E-02 | 3.931E + 00 | 1.029E-01 | 3.482E + 00 | 6.539E-02 |
| 3.876E + 00 | 1.143E-01 | 3.783E + 00 | 1.131E-01 | 3.765E + 00 | 1.034E-01 | 3.875E + 00 | 1.093E-01 | 3.438E + 00 | 7.478E-02 |
| 3.836E + 00 | 1.244E-01 | 3.743E + 00 | 1.237E-01 | 3.726E + 00 | 1.123E-01 | 3.829E + 00 | 1.189E-01 | 3.399E + 00 | 8.689E-02 |
| 3.779E + 00 | 1.454E-01 | 3.687E + 00 | 1.448E-01 | 3.671E + 00 | 1.308E-01 | 3.767E + 00 | 1.389E-01 | 3.327E + 00 | 1.063E-01 |
| 3.766E + 00 | 1.732E-01 | 3.672E + 00 | 1.729E-01 | 3.657E + 00 | 1.554E-01 | 3.752E + 00 | 1.655E-01 | 3.246E + 00 | 1.216E-01 |
| 3.699E + 00 | 2.043E-01 | 3.596E + 00 | 2.035E-01 | 3.585E + 00 | 1.825E-01 | 3.678E + 00 | 1.940E-01 | 3.058E + 00 | 1.084E-01 |
| 3.626E + 00 | 2.405E-01 | 3.515E + 00 | 2.406E-01 | 3.508E + 00 | 2.144E-01 | 3.600E + 00 | 2.274E-01 | 2.780E + 00 | 9.285E-02 |
| 3.499E + 00 | 2.315E-01 | 3.337E + 00 | 2.330E-01 | 3.335E + 00 | 2.033E-01 | 3.419E + 00 | 2.153E-01 | 2.384E + 00 | 5.418E-02 |
| 2.977E + 00 | 1.499E-01 | 2.881E + 00 | 1.552E-01 | 2.885E + 00 | 1.247E-01 | 2.947E + 00 | 1.322E-01 | 2.093E + 00 | — |
| 1.931E + 00 | — | 1.890E + 00 | — | 1.895E + 00 | — | 1.916E + 00 | — | 1.804E + 00 | — |
| 6.489E-01 | — | 6.566E-01 | — | 6.552E-01 | — | 6.519E-01 | — | 6.342E-01 | — |

The additives for use in the present invention are solid or semi-solid at ordinary ambient temperature and are blendable with the CO-containing polymer when the polymer is molten and remain dispersed when the polymer is cooled to its freezing temperature.

EXAMPLES

The following Table I illustrates the heating rate of various filler materials used in ECO polymer which has a CO content of 10% by weight. The filler is added in powder mixture or blended pellets in the amount of 10% by weight. The temperatures are given in degrees celsius. In the table the average standard deviation of the 5 runs is reported in the "ASD" column and the maximum temperature of the 5 runs is in the "MAX" column.

TABLE I

| MATERIAL | TEST NUMBER | | | | | RESULTS | |
|---|---|---|---|---|---|---|---|
| | #1 | #2 | #3 | #4 | #5 | ASD* | MAX |
| Silicon | 103.6 | 107.9 | 144.5 | 143.1 | 124.8 | 19.1 | 144.5 |
| TiO | 117.5 | 123.7 | 141.2 | 117.2 | 124.9 | 9.8 | 141.2 |
| Antimony | 104.7 | 105.7 | 124.0 | 140.4 | 118.7 | 14.7 | 140.4 |
| SiC | 105.0 | 109.8 | 135.0 | 133.7 | 120.9 | 13.6 | 135 |
| SrTiO$_3$ | 94.0 | 104.3 | 134.3 | 131.6 | 116.1 | 17.3 | 134.3 |
| Zirconia | 103.2 | 99.9 | 128.4 | 122.0 | 113.4 | 12.1 | 128.4 |
| MgTiO$_3$ | 82.7 | 90.2 | 116.3 | 121.5 | 102.7 | 16.5 | 121.5 |
| Al$_2$O$_3$ | 84.6 | 92.2 | 118.4 | 119.3 | 103.6 | 15.5 | 119.3 |
| BiTiO$_3$ | 90.1 | 95.5 | 115.7 | 117.7 | 104.8 | 12.1 | 117.7 |
| Na$_2$Ti$_3$O$_7$ | 63.0 | 65.3 | 109.7 | 114.7 | 88.2 | 24.1 | 114.7 |
| CaTiO$_4$ | 93.5 | 97.5 | 112.4 | 111.5 | 103.7 | 8.4 | 112.4 |
| Virgin | 105.0 | 110.9 | 108.0 | | | 3.0 | 110.9 |
| Virgin | 105.3 | 105.3 | 105.3 | | | 0.0 | 105.3 |
| Virgin | 97.8 | 100.6 | 99.2 | | | 1.4 | 100.6 |
| Virgin | 72.6 | 87.8 | 99.1 | 91.5 | 88.6 | 9.7 | 99.1 |

The following dielectric properties of materials as a function of frequency are taken from "Dielectric Materials and Applications", edited by Arthur R. von Hippel. All reported LF values have been multiplied by 10,000.

| MATERIAL | PROPERTY | FREQUENCY (MHz) | | | | | | |
|---|---|---|---|---|---|---|---|---|
| | | 0.01 | 0.1 | 1.0 | 10 | 100 | 300 | 3000 |
| (NH$_4$)H$_2$PO$_4$ | DC | 55.9 | 55.9 | 55.9 | 55.9 | 55.9 | 55.9 | |
| | LF | 4.6 | 5 | 5 | 5 | 5 | 10 | |
| MgO | DC | 9.65 | 9.65 | 9.65 | 9.65 | 9.65 | | |
| | LF | 3 | 3 | 3 | 3 | 3 | | |
| Al$_2$O$_3$ | DC | 8 | | | | | | |

-continued

| MATERIAL | PROPERTY | FREQUENCY (MHz) | | | | | | |
|---|---|---|---|---|---|---|---|---|
| | | 0.01 | 0.1 | 1.0 | 10 | 100 | 300 | 3000 |
| NaCl | LF | 2 | | | | | | |
| | DC | 5.9 | 5.9 | 5.9 | 5.9 | | | |
| SiO$_2$ | LF | 1 | 2 | 2 | 2 | | | |
| | DC | 3.78 | 3.78 | 3.78 | 3.78 | 3.78 | | 3.78 |
| BaTiO$_3$ | LF | 6 | 4 | 2 | 1 | 1 | | 0.6 |
| | DC | 1170 | 1153 | 1143 | 1140 | | 1100 | 600 |
| CaTiO$_3$ | LF | 150 | 120 | 105 | 75 | | 500 | 3000 |
| | DC | 168 | 168 | 168 | 168 | | 167 | 165 |
| SrTiO$_3$ | LF | 2.5 | 2 | 2 | 2 | | 5 | 23 |
| | DC | 232 | 232 | 232 | 232 | 232 | 232 | 232 |
| MgTiO$_3$ | LF | 8 | 5 | 2 | 1 | 1 | 1 | 1 |
| | DC | 13.9 | 13.9 | 13.9 | 13.9 | 13.9 | 13.9 | 13.8 |
| TiO$_2$ | LF | 9 | 7 | 4 | 4 | 5 | 9 | 17 |
| | DC | 86 | 86 | 86 | 86 | | | |
| | LF | 9 | 4 | 2 | 2 | | | |

What is claimed is:

1. A method for heating olefin/carbon monoxide copolymers, comprising:
    dispersing an amount of an agent in an olefin polymer containing from about 1 percent up to about 50 percent by weight of carbon monoxide groups along the polymer chain;
    subjecting the polymer to high frequency radiation effective to heat the dispersion;
    wherein said agent has a higher dielectric constant and a lower loss factor at said frequency, relative to said olefin polymer, said amount being effective to increase the rate and/or extent of the heating of the polymer.

2. The method of claim 1, wherein the radiation is at a frequency of from 1 to 3,000 MHz.

3. The method of claim 1, wherein the radiation is at a frequency of from 1 to 300 MHz.

4. The method of claim 1, wherein the radiation is at a frequency of from 300 to about 3,000 MHz.

5. The method of claim 1, wherein the polymer comprises a copolymer of ethylene and CO, optionally containing a minor amount of at least one other copolymerizable olefinically unsaturated comonomer.

6. The method of claim 19, wherein the polymer is E/CO, E/CO/AA, E/CO/MAA, E/CO/VA, E/CO/VOH, E/CO/EA, E/CO/MA, E/CO/MMA, or E/CO/BA.

7. The method of claim 1, wherein the agent is silicon, titanium monoxide, antimony, silicon carbide, strontium titanate, zirconium oxide, magnesium titanate, bismuth titanate, sodium titanate, calcium titanate, or amonium phosphate.

8. The method of claim 1, wherein said agent has a dielectric constant of at least about 10 and a loss factor of not more than about 0.05 at said frequency.

9. A composition thermally responsive to HF radiation, comprising:
    a CO-containing olefin copolymer containing from about 1 percent up to about 50 percent by weight of carbon monoxide groups along the polymer chain; and
    dispersed therein, an agent having a higher dielectric constant and a lower loss factor relative to said olefin copolymer, in an amount effective to increase the rate and/or extent of the thermal responsiveness of the polymer to said radiation.

10. The composition of claim 9, wherein the radiation is at a frequency of from 1 to 3,000 MHz.

11. The composition of claim 9, wherein the radiation is at a frequency of from 1 to 300 MHz.

12. The composition of claim 9, wherein the radiation is at a frequency of from 300 to about 3,000 MHz.

13. The composition of claim 9, wherein the polymer comprises a copolymer of ethylene and CO, optionally containing a minor amount of at least one other copolymerizable olefinically unsaturated comonomer.

14. The composition of claim 9, wherein the polymer is E/CO, E/CO/AA, E/CO/MAA, E/CO/VA, E/CO/VOH, E/CO/EA, E/CO/MA, E/CO/MMA, or E/CO/BA.

15. The composition of claim 9, wherein the agent is silicon, titanium monoxide, antimony, silicon carbide, strontium titanate, zirconium oxide, magnesium titanate, bismuth titanate, sodium titanate, calcium titanate, or ammonium phosphate.

16. The composition of claim 9, wherein said agent has a dielectric constant of at least about 10 and a loss factor of not more than about 0.05 over at least a part of a range of radiation frequencies from about 1 MH$_z$ to about 10,000 MH$_z$.

* * * * *